(12) United States Patent
Conrad (10) Patent No.: US 6,312,606 B1
(45) Date of Patent: *Nov. 6, 2001

(54) METHOD FOR MEASURING THE DEGREE OF TREATMENT OF A MEDIUM BY A GAS

(75) Inventor: Wayne Ernest Conrad, Hampton (CA)

(73) Assignee: Fantom Technologies Inc., Welland (CA)

(*) Notice: Subject to any disclaimer, the term of this patent is extended or adjusted under 35 U.S.C. 154(b) by 0 days.

This patent is subject to a terminal disclaimer.

(21) Appl. No.: 09/706,738

(22) Filed: Nov. 7, 2000

Related U.S. Application Data (63) Continuation of application No. 09/240,616, filed on Feb. 1, 1999, now Pat. No. 6,235,207.

(30) Foreign Application Priority Data

Nov. 9, 1998 (CA) .................................................. 2253690

(51) Int. Cl.[7] .................................................. C02F 1/78
(52) U.S. Cl. .............................. 210/742; 210/760; 422/3; 73/19.01
(58) Field of Search .................. 422/3, 82.12; 73/25.01, 73/23.2, 19.01; 374/10; 210/739, 742, 760; 95/8, 14, 18

(56) References Cited

U.S. PATENT DOCUMENTS

| 5,053,140 | 10/1991 | Hurst ..................................... 210/704 |
| 5,116,574 | * 5/1992 | Pearson ............................... 210/252 |
| 5,167,927 | 12/1992 | Karlson ................................ 422/90 |
| 5,427,693 | 6/1995 | Mausgrover et al. ............... 210/739 |
| 5,470,197 | * 11/1995 | Cafarelli .............................. 415/90 |
| 5,683,576 | 11/1997 | Olsen ................................... 210/138 |
| 5,961,919 | 10/1999 | Tachibana et al. ..................... 422/3 |
| 6,013,189 | 1/2000 | Burris .................................. 210/760 |
| 6,168,645 | * 1/2001 | Succi et al. ........................... 96/111 |

* cited by examiner

Primary Examiner—David A. Simmons
Assistant Examiner—Frank M. Lawrence
(74) Attorney, Agent, or Firm—Philip C. Mendes da Costa; Bereskin & Parr (57) ABSTRACT

A method and apparatus for monitoring the degree of treatment of a material by a reactive fluid is monitored by reacting the unreacted fluid to produce a signal, eg. heat, and measuring the signal so produced.

19 Claims, 4 Drawing Sheets

METHOD FOR MEASURING THE DEGREE OF TREATMENT OF A MEDIUM BY A GAS

This application is a continuation of application Ser. No. 09/240,616 filed on Feb. 1, 1999, now U.S. Pat. No. 6,235,207.

FIELD OF THE INVENTION

The present invention relates to a method and apparatus for measuring the degree of treatment of a medium by a gas. In one particular embodiment, the present invention relates to a method and apparatus for determining the degree of oxidative treatment of a medium, such as water, by measuring the total amount of oxidative agent, such as ozone, passing through the water without undergoing a conversion to oxygen.

BACKGROUND TO THE INVENTION

In many areas, a gas is used as a processing agent to treat a material. Examples of this include water treatment, waste water treatment and chemical oxidation (i.e. bleaching).

Accordingly, various different sensors have been developed to measure the level of a gas in a liquid. These include ORP sensors, photometric devices and electrolytic devices.

Ozone is used in various applications in industry and accordingly, sensors for detecting the concentration of ozone have been developed. Typically, these operate by passing ultraviolet light through a fluid stream and measuring the ultraviolet light which is received on a detector. Another type of gas sensor is disclosed in U.S. Pat. No. 5,167,9256 to Karlson. Karlson discloses a monitor which measures the heat energy which is released when a gas, eg. ozone, is catalytically converted to a different compound (eg. oxygen).

One example of the use of ozone is to purify water for drinking by passing ozone through the water to kill microorganism contaminants such as bacteria present in the water. Various processes to treat water have been developed using combinations of filtration and ozonation.

For example, U.S. Pat. No. 5,683,576 to Olsen describes an apparatus for treating contaminated water by passing ozone through the water. In the system disclosed by Olsen, an ozone containing gas is passed through the water to be treated, until the instantaneous concentration of ozone in the head space above the water being treated reaches a predetermined level. Then, the flow of ozone through the water continues for a predetermined period of time.

The amount of ozone which must be passed through the water to purify it to any particular state will vary depending upon the initial quality of water to be treated. For example, untreated well or lake water may require a higher degree of purification than treated city water which has previously been treated to some degree.

One disadvantage of Olsen is that it can not be reliable used with such disparate types of water supply. Olsen does not monitor the total amount of ozone which passes through the water unreacted. Thus, the actual degree of treatment of the water is not measured. The system is designed only to ensure that a predetermined minimum amount of ozone passes through the system unreacted. The system makes the assumption that once the concentration of ozone reaches the predetermined level, that it does not subsequently drop below that level, or rise above that level. Further, it assumes that once the water to be treated has been exposed to the preset ozone concentration for a predetermined time that the water is suitable for use. However, depending on the degree of contamination of the water to be treated, the time required to treat the material will vary.

In Olsen, the amount of unreacted ozone passing through the system prior to the time when the instantaneous concentration reaches the predetermined level is not measured. Further, the amount of unreacted ozone passing through the system measured during the predetermined amount of time after the predetermined instantaneous concentration is reached is not measured. Thus, the actual degree of treatment of the water is not measured.

Another disadvantage of the method of Olsen is that, in some applications, it is desirable to monitor the degree of treatment of material as it is being oxidized.

Accordingly, there is a need for a method and apparatus to accurately measure the amount of treatment to which water has been subjected by passing ozone through the water. Further, there is a need to do so on a cost effective scale.

SUMMARY OF THE INVENTION

In accordance with one aspect of the present invention, there is provided a method of treating a material to a predetermined state with a reactable gas comprising the steps of:

(a) contacting the reactable gas and the material to treat the material and obtaining treated material, the by-product and unreacted gas;

(b) comparing the unreacted gas having treated the material without having being converted into the by-product with a preset amount corresponding to a predetermined state of treatment of the material; and, (c) treating the material until a prespecified condition is met, the prespecified condition selected from the group:
  (i) until the total amount of unreacted gas is at least equal to the preset amount, or
  (ii) for a predetermined time.

In one embodiment, the method additionally comprises the steps of:

(a) stopping the flow of the reactable gas after the total amount of unreacted gas is at least equal to the preset amount; and, (b) issuing a signal to a user that the material has been treated to the predetermined state.

In another embodiment, the material to be treated comprises water and the reactable gas is ozone and the method further comprises passing the reactable gas as finely dispersed bubbles through the water.

In another embodiment, step (b) comprises treating at least a portion of the unreacted gas to produce a signal and determining the amount of unreacted gas based on the signal produced.

In another embodiment, step (b) comprises subjecting at least a portion of the unreacted gas to a chemical reaction to produce heat and determining the amount of unreacted gas based on the heat produced. In a preferred embodiment, all of the unreacted gas is subjected to the chemical reaction.

In another embodiment, the step of determining the amount of unreacted gas based on the heat produced comprises measuring the amount of heat produced; and, calculating the total amount of heat produced by the unreacted gas, wherein the preset amount is determined based on the total amount of heat released by the unreacted gas when the material has been treated to the predetermined state of treatment.

In another embodiment, the step of measuring the amount of heat produced comprises measuring the change in temperature of the unreacted gas from subjecting the unreacted gas to the chemical reaction; and, correlating the temperature differential to the amount of unreacted gas.

In another embodiment, the step of measuring the amount of heat produced comprises:

(a) measuring a first temperature of the unreacted gas;
(b) measuring a second temperature of the gas after subjecting the unreacted gas to the chemical reaction;
(c) calculating the difference between the first temperature and the second temperature; and,
(d) correlating the temperature differential to the amount of unreacted gas.

In another embodiment, the material to be treated comprises water and the reactable gas is ozone and the step of subjecting at least a portion of the unreacted gas to a chemical reaction comprises exposing the ozone to a catalyst to convert ozone into oxygen.

In another embodiment, the method further comprises the step of forming a liquid solution containing microbubbles of the reactable gas prior to contacting the reactable gas with the material.

In another embodiment, the method further comprises passing a liquid and the reactable gas through a prandtl layer turbine and a reduced pressure zone downstream of the prandtl layer turbine prior to contacting the reactable gas with the material.

In another embodiment, the method further comprises passing the material to be treated and the reactable gas through a prandtl layer turbine and a reduced pressure zone downstream of the prandtl layer turbine.

In accordance with another aspect of the present invention, there is provided an apparatus for measuring the degree to which a material has been treated with a reactable fluid, the reactable fluid capable of treating the material and in the process being converted into a by-product, the apparatus comprising:

(a) a container for containing the material during treatment with the reactable fluid;
(b) an inlet for introducing the reactable fluid into the container to treat the material;
(c) a sensor for sensing the amount of unreacted reactable fluid exiting the container in an unreacted state; and,
(d) a controller for comparing the amount of reactable fluid exiting the container in an unreacted state with a preset amount corresponding to a predetermined state of treatment of the material and treating the material until a prespecified condition is met, the prespecified condition selected from the group:
  (i) until the total amount of unreacted fluid is at least equal to the preset amount, or
  (ii) for a predetermined time corresponding to an estimate of the time required for material to be treated to the predetermined state in the apparatus.

In another embodiment, the material to be treated comprises water and the reactable fluid is ozone and the reactable gas is introduced into the container as finely dispersed bubbles.

In another embodiment, the apparatus further comprising a passage to convey at least a portion of the fluid to the sensor.

In another embodiment, the unreacted fluid is conveyed to the sensor and the sensor comprises a zone for treating the unreacted fluid to produce a signal.

In another embodiment, the unreacted fluid is conveyed to the sensor and the sensor comprises a reaction zone for subjecting the unreacted fluid to a chemical reaction, the reaction zone having an inlet end and an outlet end, and the reactable fluid exhibits a detectable change in temperature after being subjected to the chemical reaction.

In another embodiment, the sensor further comprises:

(a) a first temperature sensor for measuring the temperature of unreacted fluid upstream of the reaction zone; and,
(b) a second temperature sensor for measuring the temperature of the fluid after being subjected to the chemical reaction.

In another embodiment, the controller comprises a comparator for comparing the difference in temperature between the measurements of the first and second temperature sensors, and relating the difference in temperature to the preset amount.

In another embodiment, the reaction zone comprises a catalyst for converting the unreacted fluid entering the reaction zone into a waste by-product. The unreacted fluid may comprise ozone, and the catalyst may be selected from the group of catalysts consisting of manganese dioxide, titanium dioxide, iron oxide and carbon. At least a portion of the second temperature sensor may be provided with the catalyst.

In another embodiment, the first and second temperature sensors are in the form of thermistors and measure the electrical resistance across the sensors as a function of temperature.

In another embodiment, the apparatus further comprises a signal to indicate that the material has been treated to the predetermined state.

In another embodiment, the reactable fluid is a gas and the apparatus further comprises a prandtl layer turbine and a reduced pressure zone positioned downstream of the prandtl layer turbine, the reactable fluid being fed with a liquid through the prandtl layer turbine prior to the reactable fluid being fed to the container. The liquid may comprise the material to be treated.

In accordance with another aspect of the present invention, there is provided an apparatus for measuring the degree to which a material has been treated with a reactable fluid, the reactable fluid capable of treating the material and in the process being converted into a by-product, the apparatus comprising:

(a) means for retaining the material during treatment with the reactable fluid;
(b) means for contacting the reactable fluid with the material;
(c) means for determining the amount of reactable fluid which does not react with the material; and,
(d) means for determining the degree of treatment based on the amount of reactable fluid which does not react with the material and treating the material until a prespecified condition is met, the prespecified condition selected from the group:
  (i) until the total amount of reactable fluid which does not react with the material is at least equal to the preset amount, or
  (ii) for a predetermined time corresponding to an estimate of the time required for material to be treated to the predetermined state in the apparatus.

In another embodiment, the material to be treated comprises water and the reactable fluid is an oxidant and the reactable gas is introduced into the container as finely dispersed bubbles.

In another embodiment, the means for determining the amount of reactable fluid which does not react with the material comprises means for subjecting the unreacted fluid to a reaction to cause a temperature change in unreacted fluid due to the chemical reaction.

In another embodiment, the means for determining the degree of treatment comprises means for comparing the temperature change and relating the temperature change to the preset amount.

In another embodiment, the apparatus further comprises means to signal the user when the prespecified condition is met.

In another embodiment, the apparatus further comprises means to stop treatment of the material when the prespecified condition is met.

In another embodiment, the reactable fluid is a gas and the apparatus further comprises means for forming a liquid solution containing microbubbles of the reactable gas prior to contacting the reactable gas with the material.

In another embodiment, the reactable fluid is a gas and the apparatus further comprises a prandtl layer turbine and a reduced pressure zone downstream of the prandtl layer turbine, the reactable fluid being fed with a liquid through the prandtl layer turbine prior to the reactable fluid being fed to the means for retaining the material during treatment. The liquid may comprise the material to be treated.

One advantage of the instant method and apparatus is that the degree of treatment of a material is indirectly measured. Provided a known quantity of material to be treated is placed in the container, then the amount of reactable fluid required to treat the material to a desired degree of treatment can be theoretically determined. Based on the efficiency of the apparatus, the average amount of reactable fluid required to treat the material to a desired degree of treatment can be determined. As the amount of reactable fluid introduced into the container to treat the material may be determined (either for example, by knowing the input rate, the rate of generation of the material) the amount of unreacted fluid upstream of the treatment area may be correlated to the degree of treatment of the material.

In particular, the unreacted fluid is treated to produce a signal which may be easily measured by equipment known to those skilled in the art. For example the unreacted fluid may be subjected to a chemical reaction to produce a temperature change which may easily be measured such as by a thermistor. By measuring the signal, the amount of unreacted fluid may be tracked and the progress of the treatment of the material may be determined by comparing the amount of unreacted fluid measured via the signal with the degree of treatment associated with the production of that amount of unreacted fluid.

A further advantage is that a signal may be sent to a user if one or more circumstances arise. For example, a treatment profile may be determined for the apparatus comprising the degree of treatment of the material against the amount of unreacted fluid measured by the sensor. If the treatment profile is not matched in use, then the material may require more treatment than anticipated and the user may be so advised, the apparatus may be defective and the user may be so advised of the use of the apparatus may match the treatment profile in which case the user may be advised that the treatment was successful.

A further advantage is that these results may be achieved on a cost effective basis since a sensor measures not the unreacted fluid itself, but a signal which may be correlated to the amount of unreacted fluid.

BRIEF DESCRIPTION OF THE DRAWINGS

These and other features of the present invention will be more fully and completely understood through a conjunction of the following description taken together with the drawings of a preferred embodiment of the invention in which.

DETAILED DESCRIPTION OF THE PREFERRED EMBODIMENT

The method and apparatus of the present application may be used in conjunction with the treatment of a material with a fluid. The fluid may be any fluid which can be treated to provide a detectable signal. Preferably, the fluid may be any fluid which will under go a temperature change when treated. For example, the fluid may be subjected to a chemical reaction pursuant to which there is a detectable temperature change. Any such fluid is referred to as a "reactable fluid". Preferred example of such reactable fluids are oxidants, eg. ozone and peroxide, which release heat when reacted to form oxygen. It will be appreciated that if the reactable fluid reacts to produce a by-product, the by-product is preferably environmentally friendly.

In a particularly preferred embodiment, the reactable fluid is a gas. This method and apparatus is preferentially used in the treatment of water to obtain, for example, potable water, and the following description exemplifies the use of the method and apparatus in conjunction with the treatment of water.

Figure 1:
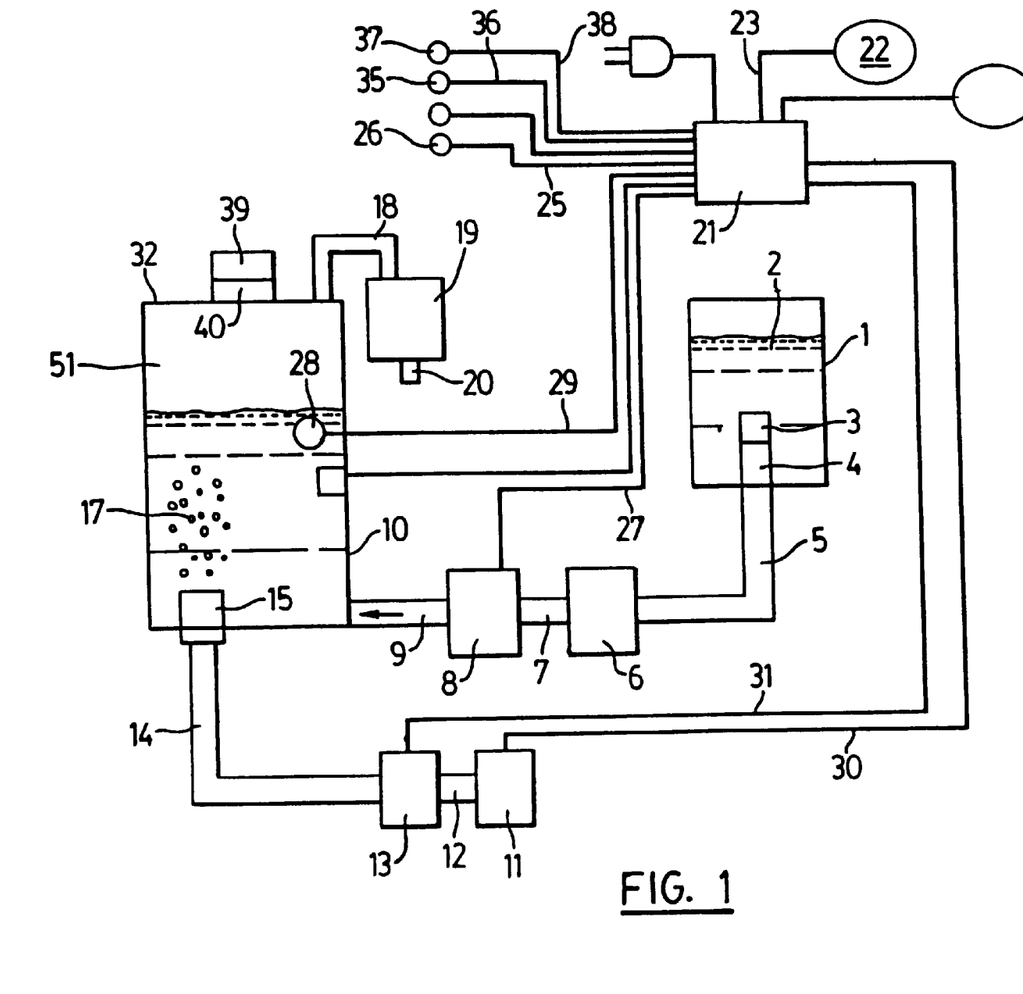
FIG. 1 is a schematic drawing of a water purification apparatus in which an ozone sensor made in accordance with a preferred embodiment of the present invention may be utilized.

Referring to FIG. 1, there is shown a schematic representation of an apparatus for purifying water, which may be used in connection with the present invention. The apparatus may be used to treat water contaminated, eg., by microorganisms so that it is fit for human consumption. The apparatus includes a water vessel 1 into which water to be treated 2 is placed. The water vessel 1 has a valve 3 and a connector 4, separating the water vessel 1 from a hose. The valve 3 and connector 4 are arranged such that when the connector 4 is in communication with hose 5 the valve 3 is open and allows contaminated water to flow from the vessel 1 into the hose 5. When the valve 3 is closed, contaminated water cannot flow from the vessel 1 to the hose 5. The water treatment cycle is controlled by means of a microcontroller 21.

When the apparatus is supplied with power, the microcontroller 21 provides power to a light 26 through wiring 25. The light 26 indicates that the power to the water treatment system is on and that the system is functioning correctly. A start button 22 is connected to the microcontroller 21 through wiring 23. The momentary depression of the start button 22 signals the microcontroller 21 to begin a water purification cycle and is considered the beginning of the water treatment cycle. The microcontroller 21 then supplies power to illuminate a light 35, indicating that the water is being treated, through wiring 36.

The micro-controller also supplies power to a water pump 8 through wiring 27. The contaminated water 2 is pumped into the hose 5 by a water pump 8. The contaminated water 2 flows from the water vessel 1 through the valve 3 and connector 4 into the hose 5. The contaminated water then flows through a filter 6 and a hose 7. The contaminated water 2 then flows through the water pump 8 and a hose 9 which may have a one way check valve, into an ozone contacting chamber 10. A float switch 28 provides a signal to the microcontroller 21 through wiring 29 when the water level reaches the height of the float switch 28.

The signal from the float switch 28 causes the microcontroller 21 to stop the water pump 8, and to start an air pump 11. The air pump 11 is connected with the micro-controller 21 through wiring 30. Similarly, the micro-controller starts an ozone generator 13 through wiring 31. The air pump 11 pumps air containing oxygen through a hose 12 into the ozone generator 13. The ozone generator 13 converts a portion of the oxygen in the air containing oxygen into ozone. The ozone containing gas then passes from the ozone generator 13 through a hose 14 and a sparger 15, causing the ozone containing gas to be dispersed into the contaminated water 2 located in the ozone contacting chamber 10, in the form of bubbles 17. Preferably, the bubbles are finely dispersed so as to provided an extended contact surface with the water and, more preferably they are microbubbles (i.e. they may have a diameter from about 1 to about 250 microns, more preferably from about 1 to about 50 and most preferably from about 1 to about 5). The ozone containing gas may be introduced to ozone contacting chamber 10 in any manner known in the art so as to provide contact between the water and the ozone, such as passing the ozone containing gas and the water counter current to each other (eg. in a packed tower) by plate contacting techniques, and stirred reaction vessels.

The unreacted ozone is collected and at least a portion is fed to ozone sensor 19. Preferably, all of the unreacted gas is fed to ozone sensor 19. In the embodiment of FIG. 1, the bubbles pass through the contaminated water 2 into head space 32 of the ozone contacting chamber 10 where they are off-gas 51. The off-gas 51 contains ozone which does not react with contaminants in the contaminated water 2. The off-gas 51 then passes through hose 18 into an ozone sensor 19. After passing through ozone sensor 19 (where remaining ozone is preferably converted into an innocuous by-product such as oxygen) the air may be discharged, eg. to the room, by a hose 20. The ozone sensor 19 will be described in detail later herein. It will be appreciated that a bleed stream of off-gas 51 may be passed to ozone sensor 19 and the remaining off-gas may be passed, eg., to an ozone destructor prior to being vented from the system (not shown).

The microcontroller 21 monitors the ozone sensor as the basis for determining when the contaminated water has been sufficiently treated. An advantage of the instant invention is that, if after a predetermined period of time the required treatment conditions are not achieved, the microcontroller 21 may cut off power to the air pump 11 and the ozone generator 13 and supplies power to illuminate a light 37 (through wiring 38), indicating that the water has not been satisfactorily treated and purified. The contaminated water 2 may then be disposed of by the user, by removing a cap 39 from the ozone contact chamber 10, and pouring the contaminated water 2 out through spout 40.

If the microcontroller 21 receives a signal from the float switch 28 through wiring 29 that the water level is no longer at the required level in the ozone contacting chamber 10, the start button will cause the microcontroller 21 to turn off the light 26 and to begin the next water treatment cycle.

The method and apparatus of the instant invention comprises may advantageously use a prandtl layer turbine as a device for mixing the reactable gas with at least one liquid. Various embodiments of prandtl layer turbines have been developed over the years. Prandtl layer turbines comprise a plurality of rotatably mounted members (generally in the form of flat discs which are typically relatively thin) which are rotatably mounted in a housing. These devices are described in the U.S. Pat. No. 1,061,206 (Tesla).

The design described in Tesla may be used as a pump or as a motor. Such devices take advantage of the properties of a fluid when in contact with the rotating surface of the discs. If the discs are driven by the fluid, then as the fluid passes through the housing between the spaced discs, the movement of the fluid will cause the discs to rotate thereby generating power which may be transmitted via a shaft for use elsewhere. Accordingly, such devices function as a motor. Conversely, if the fluid in the housing is initially static, the rotation of the discs will cause the fluid in the housing to commence rotating in the same direction as the discs thereby causing the apparatus to function as a pump, drawing the fluid through the housing. In this application, all such devices are referred to herein as a "prandtl layer turbine".

Various designs for prandtl layer turbines have been developed. These include those disclosed in the U.S. Pat. No. 4,402,647 (Effenberger), U.S. Pat. No. 4,218,177 (Robel), U.S. Re-Issue Pat. No. 28,742 (Rafferty et al.), U.S. Pat. No. 5,470,197 (Cafarelli) and U.S Pat. No. 4,655,679 (Giacomel). The method and apparatus of the instant invention is applicable to all designs of a prandtl layer turbine.

Figure 6:
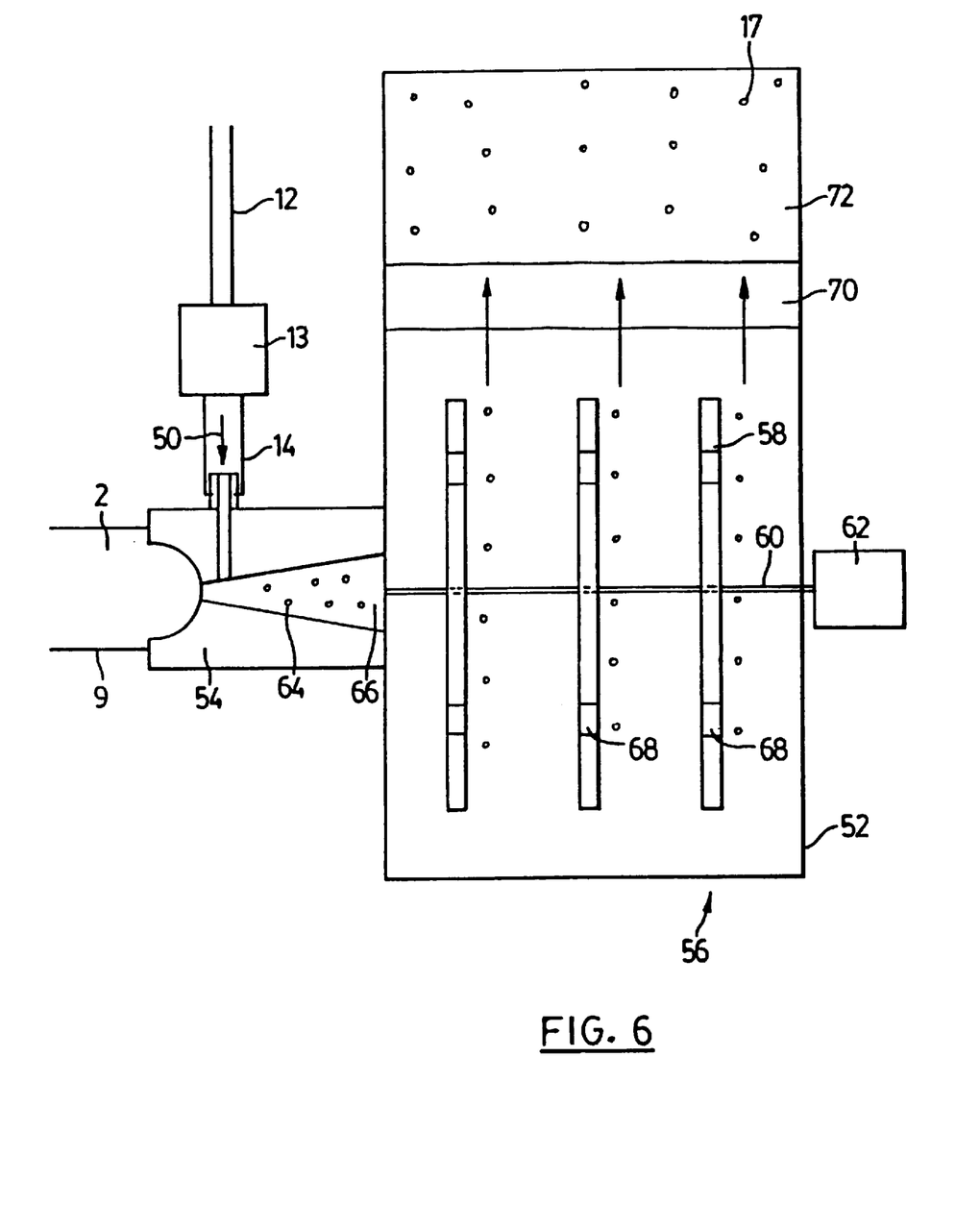

Referring to FIG. 6, fluid 2 and gas 50 are introduced into a housing 52, for example, by being drawn through a venturi 54 by means of a prandtl layer turbine 56. The prandtl layer turbine 56 consists of a series of plates (preferably discs) 58 which are non-rotatably mounted to a shaft 60 which is itself rotatably mounted in housing 52 such as by being connected to a motor 62 which provides the motive force to rotate the plates 58. The rotation of the plates 58 causes the fluid to be drawn through the venturi 54 which in turn causes a gas 50 to be drawn from the hose 14 into the venturi 54.

As shown in FIG. 6, a single fluid stream is combined with the single gas stream which are fed via venturi 54 into prandtl layer turbine 56. It will be appreciated that gas 50 may comprise one or more gases (which may be combined with one or more liquids) and, similarly, fluid 2 may comprise one or more liquids (which may be combined with one or more gases). It will further be appreciated that the gases and the liquids may be separately introduced into prandtl layer turbine 56 into prandtl layer turbine 56.

Gas 50 and fluid 2 are preferably mixed prior to their introduction into prandtl layer turbine 56. More preferably, the gas 50 is preferably mixed with fluid 2 in such a manner as to form small gas bubbles 64 in the fluid flow stream. The bubbles may vary in size from about 50 to about 250 microns in diameter, more preferably from about 50 to about $100\mu$ and, most preferably, 50 to about $75\mu$. It will further be appreciated that various other devices besides venturi 54 may be used to create bubbles 64, such as a sparger. By creating a plurality of small gas bubbles 64 which are introduced into prandtl layer turbine 56, the surface area of gas 50 in fluid 2 which is introduced into prandtl layer turbine 56 is increased thereby increasing the dissolution which may be achieved of gas 50 into fluid 2 in prandtl layer turbine 56.

The gas laden fluid stream 66 is drawn through venturi 54 and into the spaced apart plates 58 such as via openings 68 in plates 58. As the fluid is forced outwards on a radial serpentine path along the rotating plates 58 the pressure of the fluid increases thereby increasing the dissolution of the gas 50 into the liquid 4. This increase in the pressure of the fluid is possible because, unlike conventional vane or centrifugal pumps, plates 58 in prandtl layer turbine 56 will not be cavitated by the presence of the gas. The prandtl layer turbine may create a force of, for example, up to 100 psig and, more preferably up to 250 psig. The fluid with the gas dissolved therein may be sent to other apparatus for further processing.

The pressurized liquid mixture 70 is then subjected to a reduced pressure. For example, the pressurized gas and liquid mixture 70 may be passed into an expansion zone 72 wherein the pressure to which the gas and liquid mixture 70 is subjected is reduced and preferably rapidly reduced. The liquid/gas mixture in the expansion zone may be at a pressure of, for example, 30–60 psig. This depressurization may occur in under 2 seconds, preferably under 1 second and, most preferably, is effectively instantaneous upon the liquid/gas mixture entering expansion zone 72. This depressurization allows the dissolved gas to come out of solution to form a suspension of ultra-fine bubbles 17. The bubbles may vary in size from about $1\mu$ to about $20\mu$ in diameter, more preferably from about 1 micron to about 5 microns and, most preferably, from $1\mu$ to about $3\mu$. Due to the relatively fine nature of the bubbles, a large increase in the surface area of the gas is achieved. If the pressure reduction is conducted so as to achieve bubbles which are a few microns in diameter, then the number of bubbles which are achieved may be sufficiently high such that mixture 70 becomes translucent and, preferably, opaque. By varying the rate of pressure reduction and the amount of the pressure reduction, the size and the number of the bubbles may be adjusted.

If the reduced pressure mixture is used for water treatment, then gas 50 may comprise or consists of ozone and fluid 2 includes or consists essentially of water. In such a case, prandtl layer turbine 56 and expansion zone 72 may comprise an ozone chamber for treating (eg. disinfecting) water. It will be appreciated that the reduced pressure mixture may be used for various other treatment applications using a reactable gas. For example, the reduced pressure mixture may be used for treating another material (in such a case, fluid 2 may be an inert carrier). If gas 50 was an oxidation agent (eg. ozone or peroxide), then the reduced pressure mixture may be fed to a tank containing a material (eg. a chemical compound such as a pesticide or a herbicide, metal or mineral) which is to be oxidized.

It will further be appreciated that a catalyst may be added to the system. The catalyst may be added to the system with fluid stream 66 or added separately to the apparatus. For example, the catalyst may be in the form of a solid, liquid or a gas and accordingly introduced with either or both of gas 50 or fluid 2. Preferably, the catalyst is in the form of a liquid or a solid.

It will be appreciated that if fluid stream 66 is under a sufficiently great pressure as it enters prandtl layer turbine 56, that the fluid may assist motor 62 in rotating discs 58 or, alternately, turbine 56 may not include a motor 62 and, instead, fluid stream 66 may comprise the necessary motive force to cause plates 58 to rotate. Preferably, plates 58 rotate at an rpm from about 3000 to about 8000, more preferably from about 3000 to about 5000 and, most preferably, about 4000 rpm.

Figure 2:
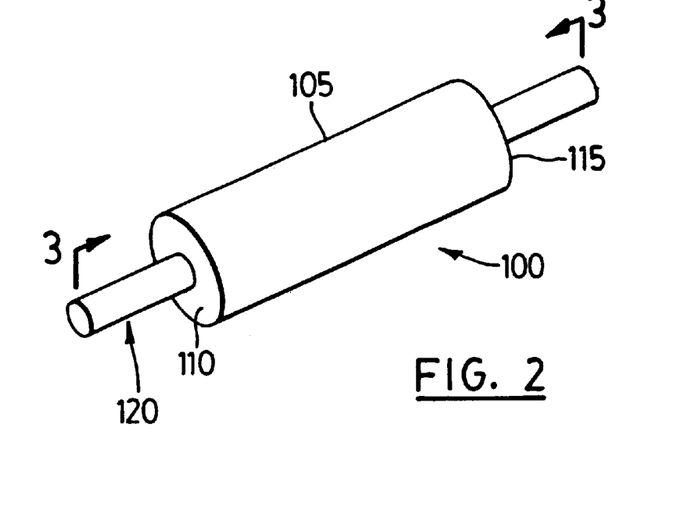
FIG. 2 is a perspective view of an ozone sensor made in accordance with a preferred embodiment of the present invention.
Figure 3:
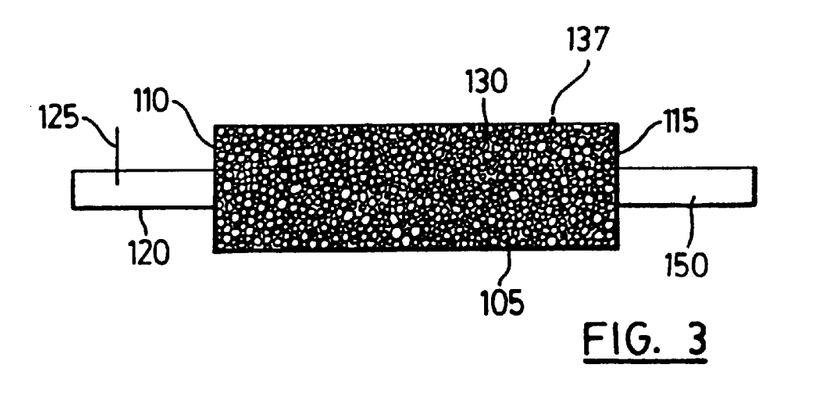
FIG. 3 is a cross sectional view of the ozone sensor of FIG. 2, taken along the line 3—3.

Referring now to FIGS. 2 and 3, there is shown an ozone sensor, referred to generally as reference numeral 100, which may be used in the previously described water purification system. The sensor 100 may be used to monitor the degree of treatment to a medium such as water, based upon the total amount of ozone which passes through the medium without being converted to oxygen. This may be achieved by monitoring the change in temperature between two sensors over time.

While the sensor 100 will be described herein for use with the water purification system previously described, it will be appreciated that the sensor may be used during treatment of various media other than water. In particular, it may be used in any application where the degree of treatment of a material with a reactable fluid, and preferably a reactable gas, may be related to the concentration of the unreacted fluid upstream of the apparatus where the treatment is conducted. For example, with reference to FIG. 6, the material to be treated may be the liquid in which the reactable gas 50 is dissolved in turbine 56. In such a case expansion zone 72 may be tank 10. Alternately, the material to be treated is positioned downstream from expansion zone 12 (eg. in tank 10). In such a case, the fluid in which the reactable gas is dissolved may be inert.

Furthermore, while the embodiment of the sensor described herein relates to detection of ozone, it will also be appreciated that it may be modified to detect any fluid and, preferably, any gas which when reacted exhibits a detectable change in temperature. The following description is based upon the use the sensor to monitor the degree of treatment of water with ozone.

The off gasses 51 pass through passage 18 to ozone sensor 19. The off gasses 51 then pass through sensor 100. In sensor 100, at least a portion of the unreacted gas is treated to produce a signal which may then be read by sensor 100. The sensor may be in the form of a temperature change in the off-gas stream, or the volume resistivity of the material, or to emit light. This may be achieved, for example, by subjecting the unreacted gas to a chemical reaction in a reaction zone containing a catalyst to produce, for example heat or light.

As shown in FIG. 3, the sensor contains a catalyst for converting ozone to oxygen. The conversion of ozone into oxygen may be represented by the following equation (1):

$$2\,O_3 \xrightarrow{\text{catalyst}} 3\,O_2 + \text{heat} \tag{1}$$

Thus, the amount of heat released during conversion of ozone to oxygen is directly related to the amount of ozone converted to oxygen and may therefore be used as a measure of the amount of ozone in the off-gas stream.

The sensor 100 includes a vessel 105 in which ozone passing through the water being treated without being converted to oxygen is then converted into oxygen. The vessel 105 may be of any suitable size, shape or construction, depending upon its designed use. For example, the vessel 105 may be a thin walled generally hollow cylinder made from stainless steel, when designed for use in a home water purification system.

The vessel 105 has an inlet end 110 and an outlet end 115 to allow an ozone containing gas to flow through the vessel 105. The ozone containing gas enters the inlet end 110 of the vessel 105 via inlet tube 120. The inlet tube 120 fluidly connects the head space above the water being purified (eg. via passage 18) with the vessel 105, to allow the flow of off-gas 51 from head space 32 into the vessel. As with the vessel, the construction of the inlet tube 120 may be of any suitable design, and in one embodiment for use in a home water purification system, is a stainless steel tube of a relatively small interior diameter. It will be appreciated that all of the off gasses may be passed through sensor 100 so as to essentially react all of the ozone to oxygen. The amount of heat produced may be correlated with the amount of unreacted ozone in the off-gas. Based on the flow rate of gas into the treatment vessel and the amount of heat produced, this may be used to calculate the total amount of ozone to which the material treated was exposed.

Alternately, passage 18 may convey only a bleed stream of the off gasses 51 to sensor 100. Sensor 100 will provide a reading of the ozone concentration in the head space by measuring the concentration in the bleed stream and, based on the flow rate into the treatment vessel and the flow rate of the bleed stream, this may be used to calculate the total amount of ozone to which the material treated was exposed.

A first temperature sensor 125 is located in the inlet tube 120, preferably near the inlet end 110 of the vessel. The first temperature sensor measures the temperature of the ozone containing gas entering the vessel 105. The temperature sensor may be any standard sensor which is known to those skilled in the art. In a preferred embodiment, the first temperature sensor 125 is in the form of a thermistor which measures temperature by measuring the electrical resistance across the sensor. As the temperature of the sensor increases, the resistance of the thermistor decreases. The temperature of the ozone containing inlet gas is thus measured by the electrical resistance of the sensor 125.

The vessel 105 contains a catalyst 130 to catalytically convert any ozone present in the gas entering the vessel 105 into oxygen. The catalyst may be any catalyst which efficiently converts ozone gas to oxygen gas. Preferably, the catalyst is selected from one or more of manganese dioxide, titanium dioxide, iron oxide, or carbon. Most preferably, the catalyst is manganese dioxide. Of course, it will be appreciated that if the fluid being detected in the vessel is other than ozone, a catalyst appropriate to that fluid will be selected. The catalyst 130 may be present in the vessel 105 in any manner, and is preferably located on the interior surface of the vessel 105. As previously discussed, heat is released during conversion of the ozone into oxygen. Accordingly, as ozone is converted to oxygen by the catalyst 130, the temperature in the vessel 105 will rise relative to the temperature of the ozone containing gas as it enters the inlet end 110 of the vessel 105.

A second temperature sensor 135 is located within the vessel 105, to measure the temperature of the gas after conversion of ozone in the gas to oxygen. The second temperature sensor 135, like the first temperature sensor 125, may be any known device for measuring temperature. In the preferred embodiment, the second temperature sensor 135 is in the form of a thermistor which measures the electrical resistance across the sensor 135. The second temperature sensor 135 may be located anywhere within the catalyst containing vessel, and is preferably embedded in the catalyst. This ensures an accurate reading by the second temperature sensor. However, if the vessel is thin walled or has good thermal conductivity, a second sensor 137 may be positioned on the outer wall of vessel 105. It will be appreciated that the second sensor may be positioned downstream of vessel 105. In such a case the accuracy of sensor 100 may decrease due to heat losses of the treated off-gasses between vessel 105 and the position of the second sensor.

Figure 4:
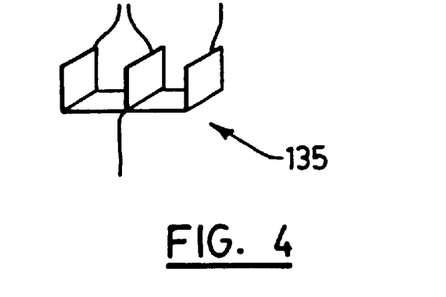
FIG. 4 is an alternate embodiment of an ozone sensor.

In the alternative embodiment shown in FIG. 4, the temperature sensor 135 may be in the form of a number of wings 140, positioned in tube 120. In this case, at least a portion of the surface area of the wings 140 is preferably coated in the catalyst 130 to define the reaction area. This embodiment may have an increased surface area so as to produce a more accurate temperature reading. Similarly, it will be appreciated that the accuracy of the temperature sensor 125 may be increased by increasing the corresponding surface area of the sensing area of the sensors.

After any ozone in the gas entering the vessel 105 at inlet end 110 has been converted to oxygen, the gas exits the vessel 105 through the outlet end 115 of the vessel, by means of outlet tube 150. Outlet tube 150 may be of any suitable construction, for example, a stainless steel tube.

The first and second temperature sensors 125 and 135 may take continuous readings of the temperature of the gas in the inlet tube and in the vessel respectively, and transmit temperature readings to a controller 21 which measures the difference in temperature between the readings of the first and second temperature sensors. If the first and second temperature sensors are in the form of thermistors, then the controller 21 measures the difference in potential resistance between the two sensors. It will be appreciated that this is a measure of the difference in temperature between the ozone containing gas contacting the first temperature sensor 125 in the inlet tube 120 and the gas contacting the second temperature sensor 135 in the vessel 105 after conversion of ozone present to oxygen. Since the temperature reading of the reacted gas stream is corrected for the temperature of the incoming gas stream by comparing the readings from sensors 125 and 135, the controller may correlate this information to the amount of ozone which has been converted to oxygen in the vessel 105 during any particular period of time.

Figure 5:
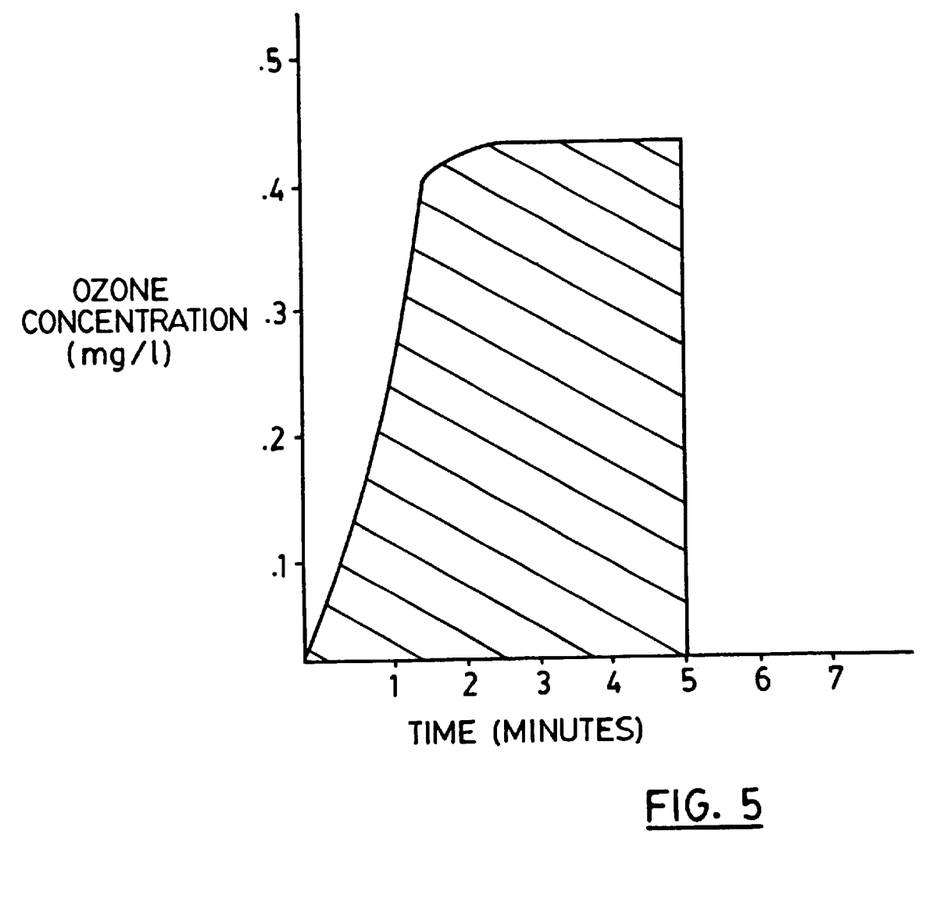
FIG. 5 is a graph showing a typical relationship between the instantaneous concentration of unreacted ozone passing through water being treated versus time; and, FIG. 6 is a schematic drawings of a gas/liquid mixing apparatus which may be used with the ozone sensor of FIG. 1.

If all of the off gases are fed to vessel 105 and if all of the ozone is converted to oxygen, then in a plot of the instantaneous difference in resistance between the first and second temperature sensors versus elapsed time, the total amount of ozone converted to oxygen during that time period is represented by the area under the plotted curve. FIG. 5 is a graph showing the difference in resistance between the first and second temperature sensors plotted as a function of time for the water treatment apparatus of FIG. 1. The area under the curve represents the total amount of ozone which has been converted into oxygen in the vessel 105. It will be appreciated that controller 21 may correct for sensor 100 converting only a portion of the ozone to oxygen and if only a bleed stream of the off gasses are fed to sensor 100.

From the foregoing, it will be appreciated that the degree to which water through which ozone is passed has been treated may be measured by calculating the area under the curve of a graph of the change in resistance plotted versus elapsed time. If finely divided bubbles of ozone are initially passed through contaminated water, essentially all of the ozone will be used in the treatment process, and very little if any will escape into the head space above the water. As a result, there will be little to no ozone to be converted into oxygen in the vessel 105, and the difference of the resistance of the first and second temperature sensors will be essentially zero.

As the water is treated and becomes purer (ie. with less active biological contaminants present), less ozone will be consumed as it passes through the water, and more will enter the vessel 105, thus causing more ozone to be converted to oxygen in the vessel. This raises the temperature in the vessel 105, and results in a greater difference between the resistance of the first temperature sensor and the second temperature sensor. When this difference in resistance between the temperature sensors is plotted against elapsed time, the area under the resulting curve increases with time.

By measuring the conversion of ozone to oxygen in vessel 105, great flexibility is obtained in the operation of the treatment cycle. For example, as the volume of water and the anticipated level of contaminants in the water can be predetermined, it is possible to calculate the amount of ozone that will be required to treat the water and to program this information into controller 21. The treatment of the water by ozonation may continue until a predetermined total amount of ozone passes through the water being treated and is then converted to oxygen in the vessel 105. The predetermined amount of ozone is represented by a predefined area under the curve of the difference in resistance between the two temperature sensors, versus time.

The controller 21 may optionally have a signal indicating apparatus (eg. light 41). The signal indicating apparatus may issue a signal to the user when the water is treated to the desired level (ie. when the area under the graph reaches a predetermined level) and is ready for use. The controller 21 also preferably controls the flow of ozone through the water being treated. When the water has been treated to the desired level, the flow of ozone through the water is stopped (eg. ozone generator 13 may be deactivated).

The signal indicating apparatus may also be used to indicate when the water being treated should not be used, eg. if it should not be consumed. For example, the amount of ozone flowing into the vessel may not reach the requisite level of treatment within a predetermined period of time, possibly indicating that the water is too contaminated and should not be consumed. In such a case, the signal indicating apparatus may indicate to a user that the water should not be used, for example by illuminating a warning light 37.

For example, the controller may be programmed with a predetermined amount of ozone which should be measured by sensor 100 (eg. a specified amount of heat must be read by sensor 100) to indicated that the water has been treated to a predetermined level. The amount of ozone may be based on trial runs in the apparatus which evidence the level of ozone in the off-gas for treating water of a known contaminant level to a specified purity. It will be appreciated that additional trial runs may be conducted for varying levels of purity and the controller may be programmed with each such level and the apparatus may have a dial or the like for adjusting the controller to a different program if the user can determine the level of contamination of the water to be treated.

The apparatus may run until the predetermined amount of ozone is measured. Alternately, or in addition, the apparatus may shut down if the predetermined level of purity is not achieved in a predetermined time. This may occur if the amount of ozone converted to oxygen in sensor 100 does not achieve the predetermined level in the predetermined period of time.

Alternatively, or in addition, if the amount of ozone flowing into the vessel reaches the requisite level more quickly than expected, a problem may exist with the dispersion of the ozone containing gas throughout the contaminated water. That is, the ozone may be passing through the water in a localized area (eg. the sparger may be broken and releasing larger bubbles into the water to be treated). In such a circumstance, the signal indicating apparatus may illuminate a warning light, indicating to the user that the apparatus should be checked to ensure it is in proper working order.

Finally, if after a predetermined length of time no ozone has been detected in the vessel, the signal means may also be programmed to issue an indication to the user to check that the ozone generator to ensure that it is working properly.

It will be appreciated that various changes may be made within the spirit of the described invention, and all such changes are within the scope of the appended claims. In particular, it will be appreciated that the method and apparatus described herein may be modified to detect various gases used to treat a various media. Further, different signalling devices may be used to alert the user instead of the use of lights, or in addition thereto. For example, an auditory signal may be used to alert the user, if, for example, the predetermined state of treatment of the material is not achieved in the predetermined time.

We claim:

1. A method of treating a material with ozone comprising the steps of:
    (a) contacting the ozone and the material and obtaining treated material, a by-product produced from the ozone and unreacted ozone;
    (b) treating at least a portion of the unreacted ozone to produce a signal indicative of the level of treatment of the material; and,
    (c) using the signal to control the treatment of the material.

2. The method as claimed in claim 1 additionally comprising the steps of:
    (a) stopping the flow of the ozone after the total amount of unreacted ozone is at least equal to a preset amount corresponding to a predetermined state of treatment of the material; and,
    (b) issuing a signal to a user that the material has been treated to the predetermined state.

3. The method as claimed in claim 1 wherein the material to be treated comprises water and the method further comprises introducing the water and the ozone to obtain potable water.

4. The method as claimed in claim 1 further comprising the step of determining the amount of unreacted ozone based on the signal produced.

5. The method as claimed in claim 1 wherein step (b) comprises subjecting at least a portion of the unreacted ozone to a chemical reaction to produce heat and determining the amount of unreacted ozone based on the heat produced.

6. The method as claimed in claim 5 wherein all of the unreacted ozone is subjected to the chemical reaction.

7. The method as claimed in claim 5 wherein the step of determining the amount of unreacted ozone based on the heat produced comprises:
    (a) measuring the instantaneous amount of heat produced;
    (b) determining the total amount of heat produced by the unreacted ozone; and,
    (c) comparing the unreacted ozone having treated the material without having being converted into the by-product with a preset amount corresponding to a predetermined state of treatment of the material
  wherein the preset amount is determined based on the total amount of heat released by the unreacted ozone when the material has been treated to the predetermined state of treatment.

8. The method as claimed in claim 5 wherein the step of measuring the amount of heat produced comprises:
    (a) measuring the change in temperature from subjecting the unreacted ozone to the chemical reaction; and,
    (b) correlating the temperature differential to the amount of unreacted ozone.

9. The method as claimed in claim 5 wherein the step of measuring the amount of heat produced comprises:
   (a) measuring a first temperature of the unreacted ozone;
   (b) measuring a second temperature of the unreacted ozone after subjecting the unreacted ozone to the chemical reaction;
   (c) calculating the difference between the first temperature and the second temperature; and,
   (d) correlating the temperature differential to the amount of unreacted ozone.

10. The method as claimed in claim 5 wherein the material to be treated comprises water and the step of subjecting at least a portion of the unreacted ozone to a chemical reaction comprises exposing the ozone to a catalyst to convert ozone into oxygen.

11. The method as claimed in claim 10 further comprising passing the ozone as finely dispersed bubbles through the water.

12. The method as claimed in claim 1 further comprising the step of forming a liquid solution containing microbubbles of the ozone prior to contacting the ozone with the material.

13. The method as claimed in claim 1 further comprising passing a fluid and the ozone through a prandtl layer turbine prior to contacting the ozone with the material.

14. The method as claimed in claim 1 further comprising passing the material to be treated and the ozone through a prandtl layer turbine and a reduced pressure zone downstream of the prandtl layer turbine.

15. The method as claimed in claim 1 wherein the treatment of the material is terminated after a predetermined time if the total amount of unreacted ozone is less than the preset amount at the end of the predetermined time.

16. The method as claimed in claim 1 further comprising passing a fluid and the ozone through a prandtl layer turbine and a reduced pressure zone downstream of the prandtl layer turbine prior to contacting the ozone with the material.

17. The method as claimed in claim 1 further comprising terminating the treatment if a preset signal is not monitored in a predetermined time.

18. The method as claimed in claim 1 further comprising the step of treating the material until a prespecified condition is met, the prespecified condition selected from the group:
   (i) until a signal is produced corresponding to a predetermined state of treatment of the material, or
   (ii) for a predetermined time.

19. The method as claimed in claim 17 further comprising terminating the treatment when a prespecified condition is met.

* * * * *